United States Patent
Kolar et al.

(10) Patent No.: US 11,909,618 B2
(45) Date of Patent: Feb. 20, 2024

(54) ACTIVELY LEARNING POPS TO PROBE AND PROBING FREQUENCY TO MAXIMIZE APPLICATION EXPERIENCE PREDICTIONS

(71) Applicant: Cisco Technology, Inc., San Jose, CA (US)

(72) Inventors: Vinay Kumar Kolar, San Jose, CA (US); Jean-Philippe Vasseur, Saint Martin d'Uriage (FR); Michal Wladyslaw Garcarz, Cracow (PL)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/714,483

(22) Filed: Apr. 6, 2022

(65) Prior Publication Data

US 2023/0327971 A1  Oct. 12, 2023

(51) Int. Cl.
*H04L 43/12* (2022.01)
*H04L 47/2475* (2022.01)

(52) U.S. Cl.
CPC .......... *H04L 43/12* (2013.01); *H04L 47/2475* (2013.01)

(58) Field of Classification Search
CPC ........................................ H04L 43/12
See application file for complete search history.

(56) References Cited

U.S. PATENT DOCUMENTS

| | | | |
|---|---|---|---|
| 10,334,322 B1 * | 6/2019 | Seddon | H04L 65/752 |
| 10,389,613 B2 | 8/2019 | Dasgupta et al. | |
| 10,897,424 B1 * | 1/2021 | Dhanabalan | H04L 43/08 |
| 11,159,576 B1 | 10/2021 | Ly et al. | |
| 11,184,403 B1 | 11/2021 | Wu et al. | |
| 2005/0038909 A1 * | 2/2005 | Yoshiba | H04L 45/16 709/241 |
| 2008/0151774 A1 * | 6/2008 | Vogel | H04L 43/55 370/252 |
| 2015/0332155 A1 * | 11/2015 | Mermoud | G06N 5/048 706/12 |
| 2015/0333997 A1 * | 11/2015 | Mermoud | H04L 45/00 370/252 |
| 2017/0250875 A1 * | 8/2017 | Jensen | H04L 41/083 |
| 2018/0159755 A1 * | 6/2018 | Dasgupta | H04L 43/16 |

(Continued)

*Primary Examiner* — John A Follansbee
*Assistant Examiner* — Fadi Haj Said
(74) *Attorney, Agent, or Firm* — BEHMKE INNOVATION GROUP LLC; James M. Behmke; James J. Wong

(57) ABSTRACT

In one embodiment, a device computes, for each of a set of points of presence (PoPs) via which traffic for an online application can be sent from a location, application experience metrics predicted for the application over time. The device assigns, for each of the set of PoPs, weights to different time periods, based on measures of uncertainty associated with the predicted application experience metrics. The device generates, based on the weights assigned to the different time periods for each of the set of PoPs, schedules for probing network paths connecting the location to the online application via those PoPs. The device causes the network paths to be probed in accordance with their schedules. Results of this probing are used to select a particular PoP from among the set of PoPs via which traffic for the online application should be sent from the location during a certain time period.

16 Claims, 15 Drawing Sheets

(56) References Cited

U.S. PATENT DOCUMENTS

| | | | |
|---|---|---|---|
| 2018/0204129 A1* | 7/2018 | Vasseur | H04L 12/1827 |
| 2019/0028329 A1* | 1/2019 | Kanakarajan | H04L 45/22 |
| 2020/0153701 A1* | 5/2020 | Mohan | H04L 41/5009 |
| 2021/0132994 A1 | 5/2021 | Casey et al. | |
| 2021/0336934 A1 | 10/2021 | Deshmukh et al. | |

* cited by examiner

ACTIVELY LEARNING POPS TO PROBE AND PROBING FREQUENCY TO MAXIMIZE APPLICATION EXPERIENCE PREDICTIONS

TECHNICAL FIELD

The present disclosure relates generally to computer networks, and, more particularly, to actively learning points of presence (POPs) to probe and probing frequency, to maximize application experience predictions.

BACKGROUND

Secure Access Service Edge (SASE) has emerged in the past few years as an important trend and concept in security and networking. In general, SASE is a network architecture whereby WAN and security are provided jointly as a service, through the use of secure gateways that combine WAN access and cloud-delivered firewalls and security. The overall intent of a SASE is to simplify the network architecture, by connecting all locations to a SASE gateway managed by a provider, such as Cisco Umbrella by Cisco Systems, Inc. The SASE gateway is then responsible for all security policies, as well as for providing WAN connectivity.

The SASE model is attractive in that it offers a simplified architecture. However, it does not come without challenges. For instance, the closest point of presence (PoP) of the SASE provider is often selected based on its location and proximity to the edge device connecting to it, under the assumption that this PoP offers the best performance, which is not always the case. Indeed, performance of the PoP used to access a cloud-hosted application can change over time, leading to decreased performance and lowered quality of experience for the user. Such degradation can also be on a per-application basis, as well. Beyond that, networking decisions have traditionally relied on path metrics to quantify the application experience. However, many applications have evolved to now be resilient to degraded path performance. For instance, some audio codecs are now resilient to packet losses up to approximately 30%, before the user experience begins to degrade.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
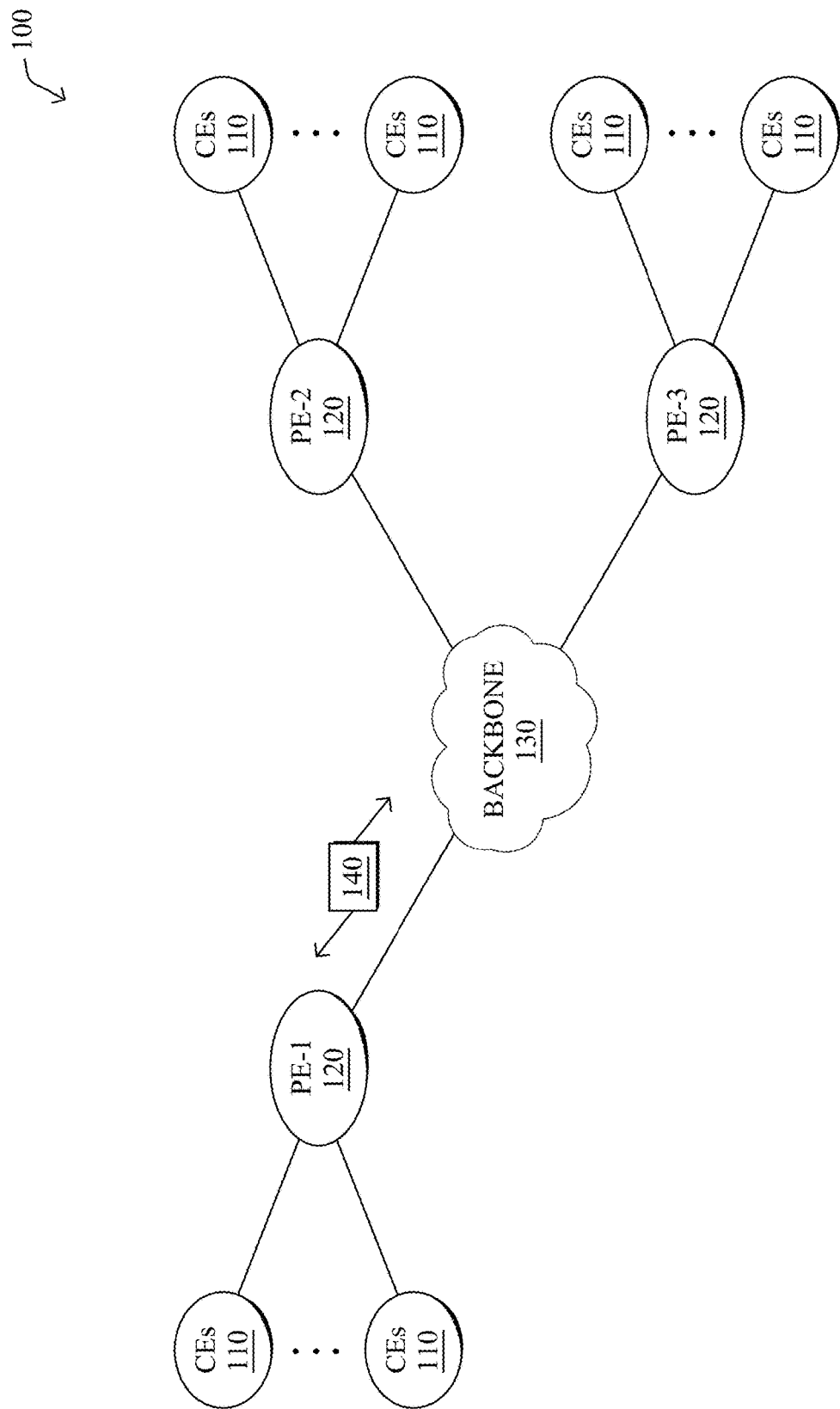
FIGS. 1A-1B illustrate an example communication network.

According to one or more embodiments of the disclosure, a device computes, for each of a set of points of presence via which traffic for an online application can be sent from a location, application experience metrics predicted for the online application over time. The device assigns, for each of the set of points of presence, weights to different time periods, based on measures of uncertainty associated with the application experience metrics predicted for the online application over time. The device generates, based on the weights assigned to the different time periods for each of the set of points of presence, schedules for probing network paths connecting the location to the online application via those points of presence. The device causes the network paths to be probed in accordance with their schedules. Results of this probing are used to select a particular point of presence from among the set of points of presence via which traffic for the online application should be sent from the location during a certain time period.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
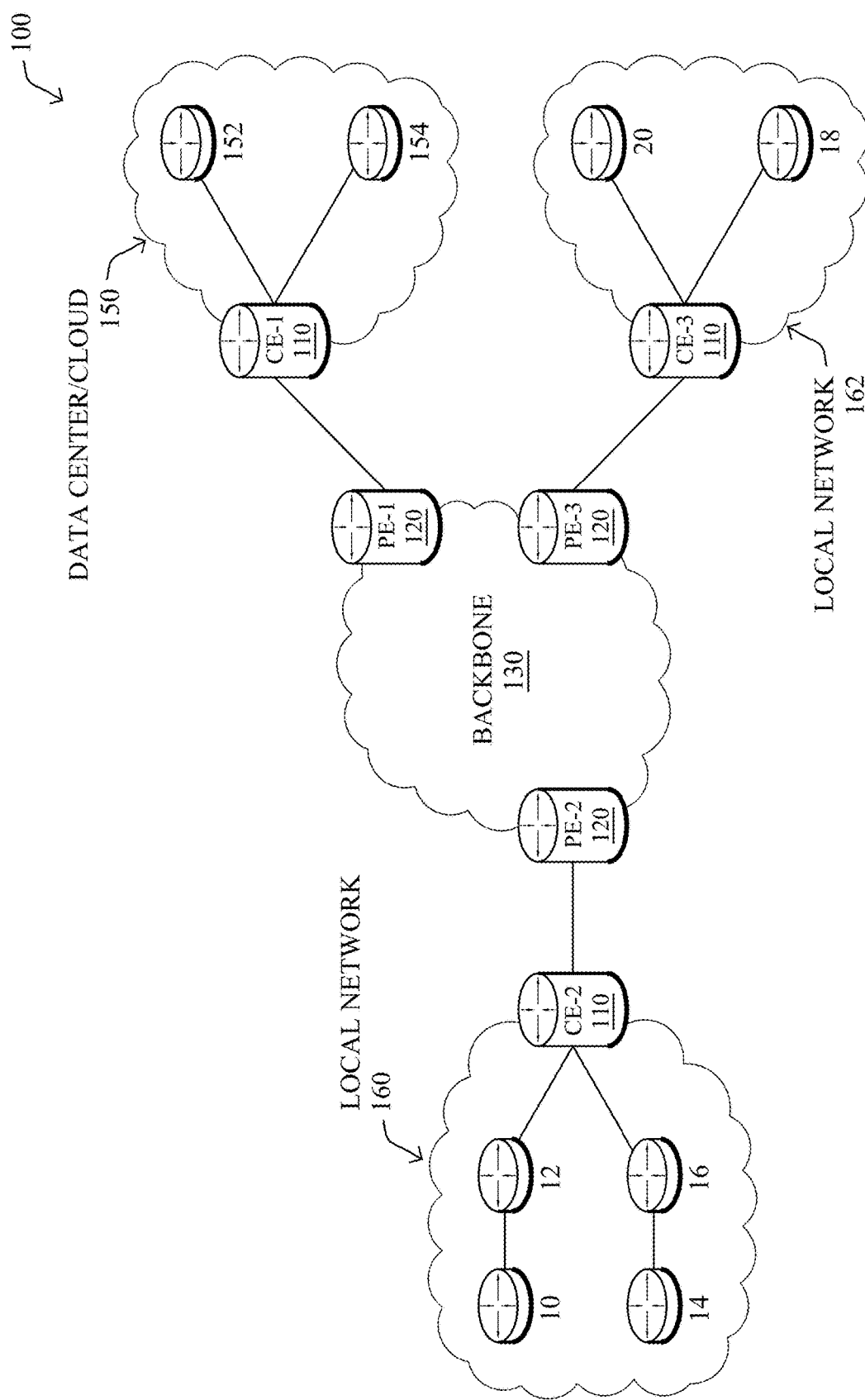

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
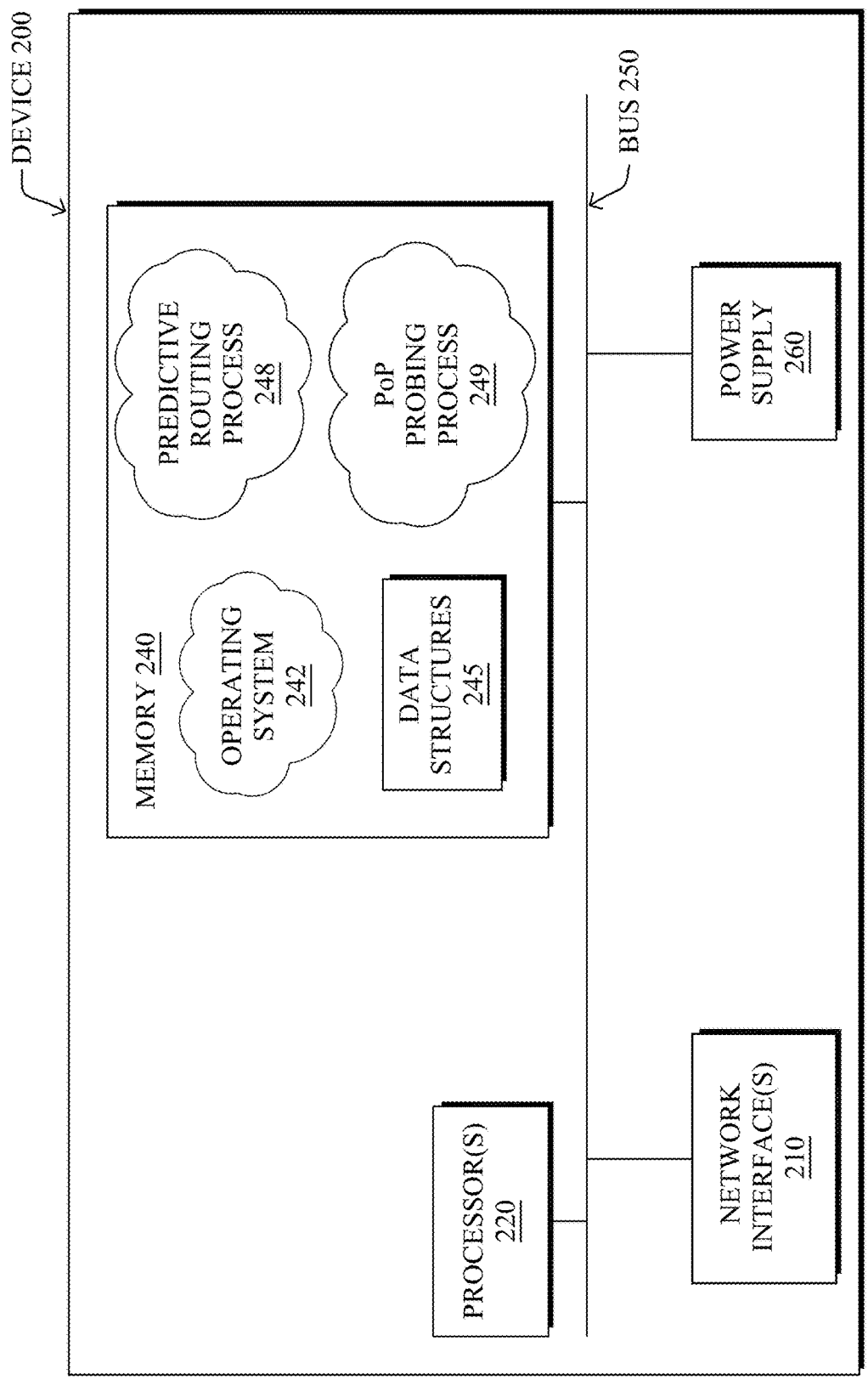
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248 and/or a point of presence (PoP) probing process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, predictive routing process 248 and/or PoP probing process 249 may include computer executable instructions that, when executed by processor(s) 220, cause device 200 to perform the techniques described herein. To do so, in some embodiments, predictive routing process 248 and/or PoP probing process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 and/or PoP probing process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 and/or PoP probing process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
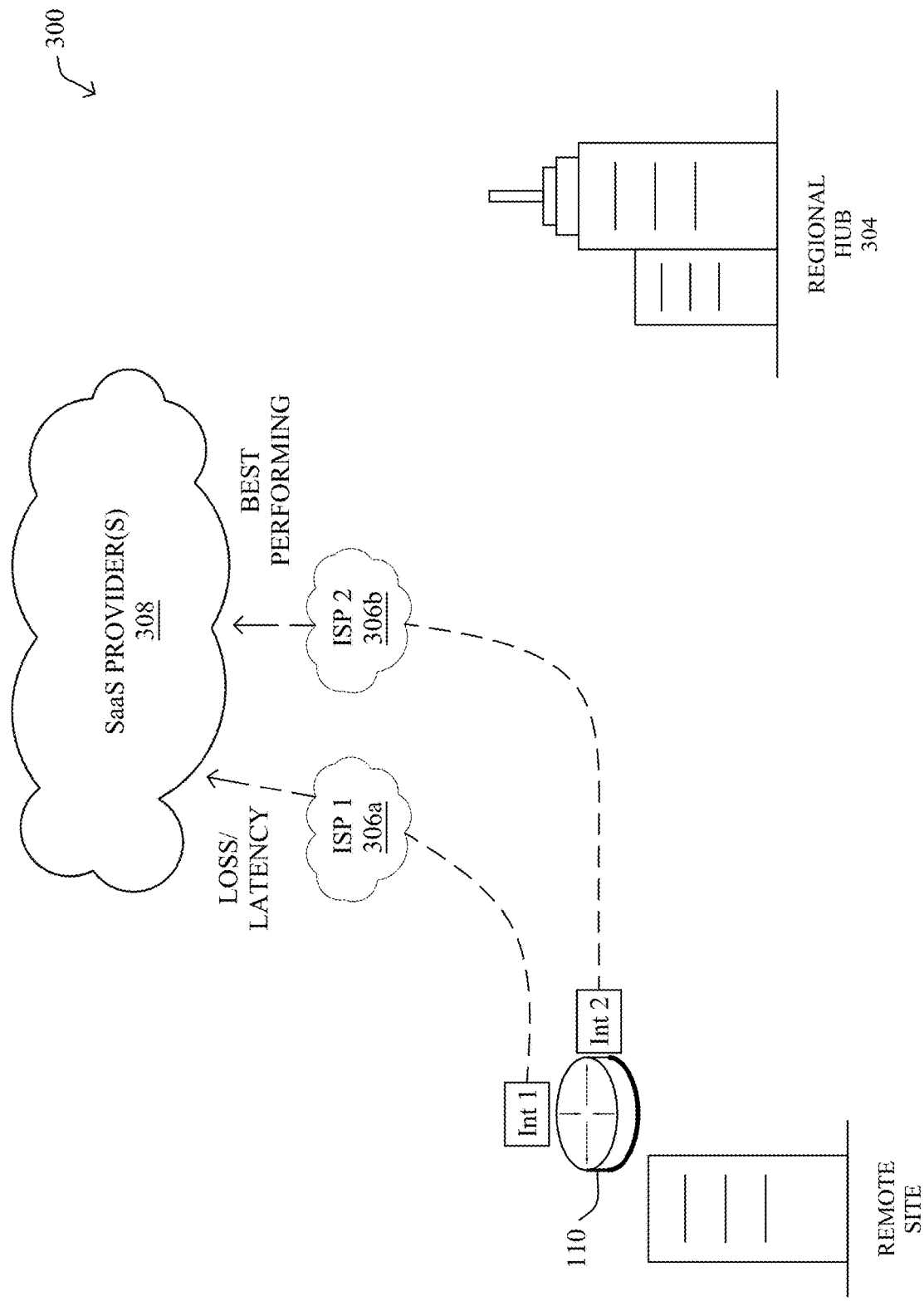
FIGS. 3A-3B illustrate example network deployments.
Figure 3B:
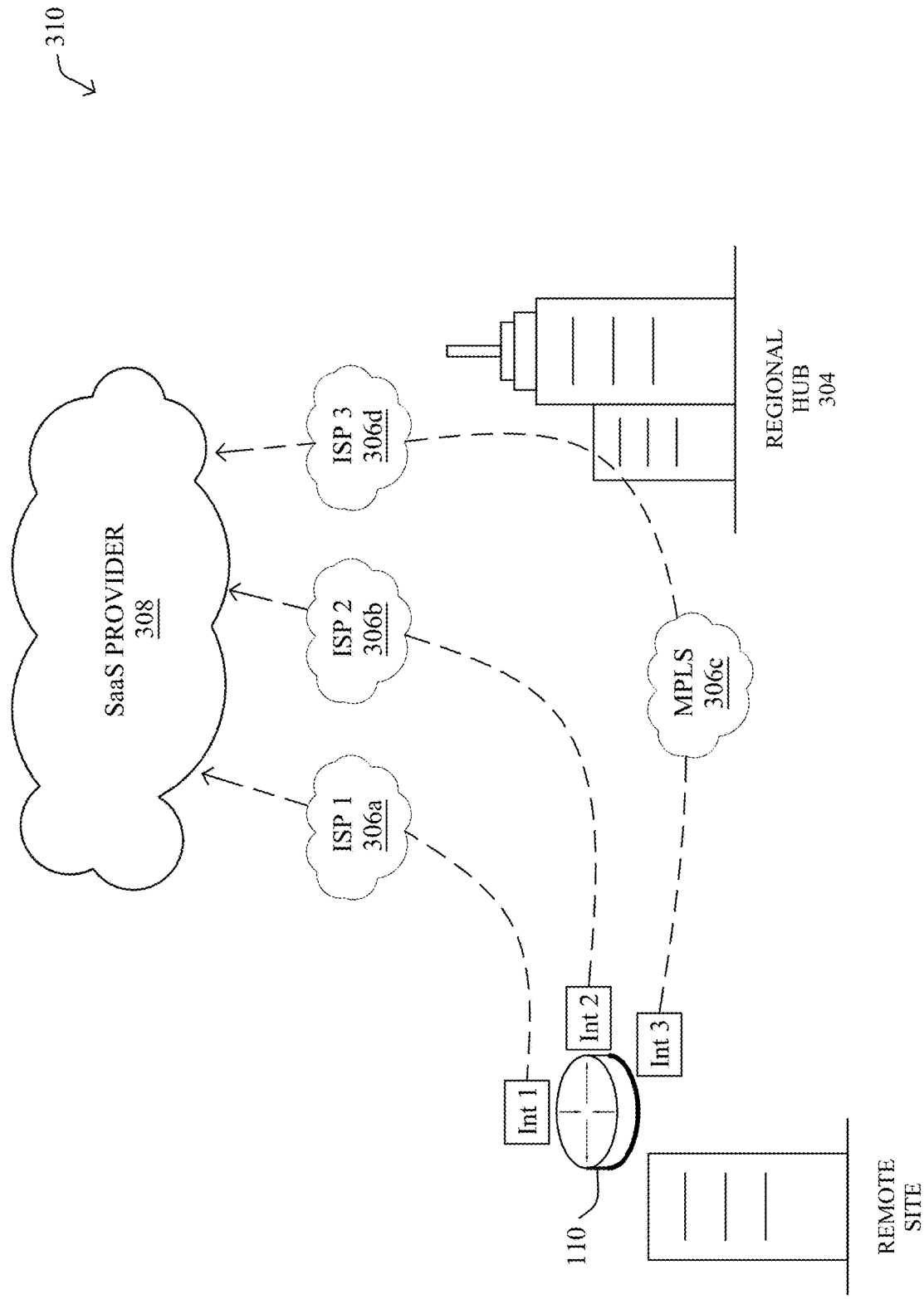

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider (s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
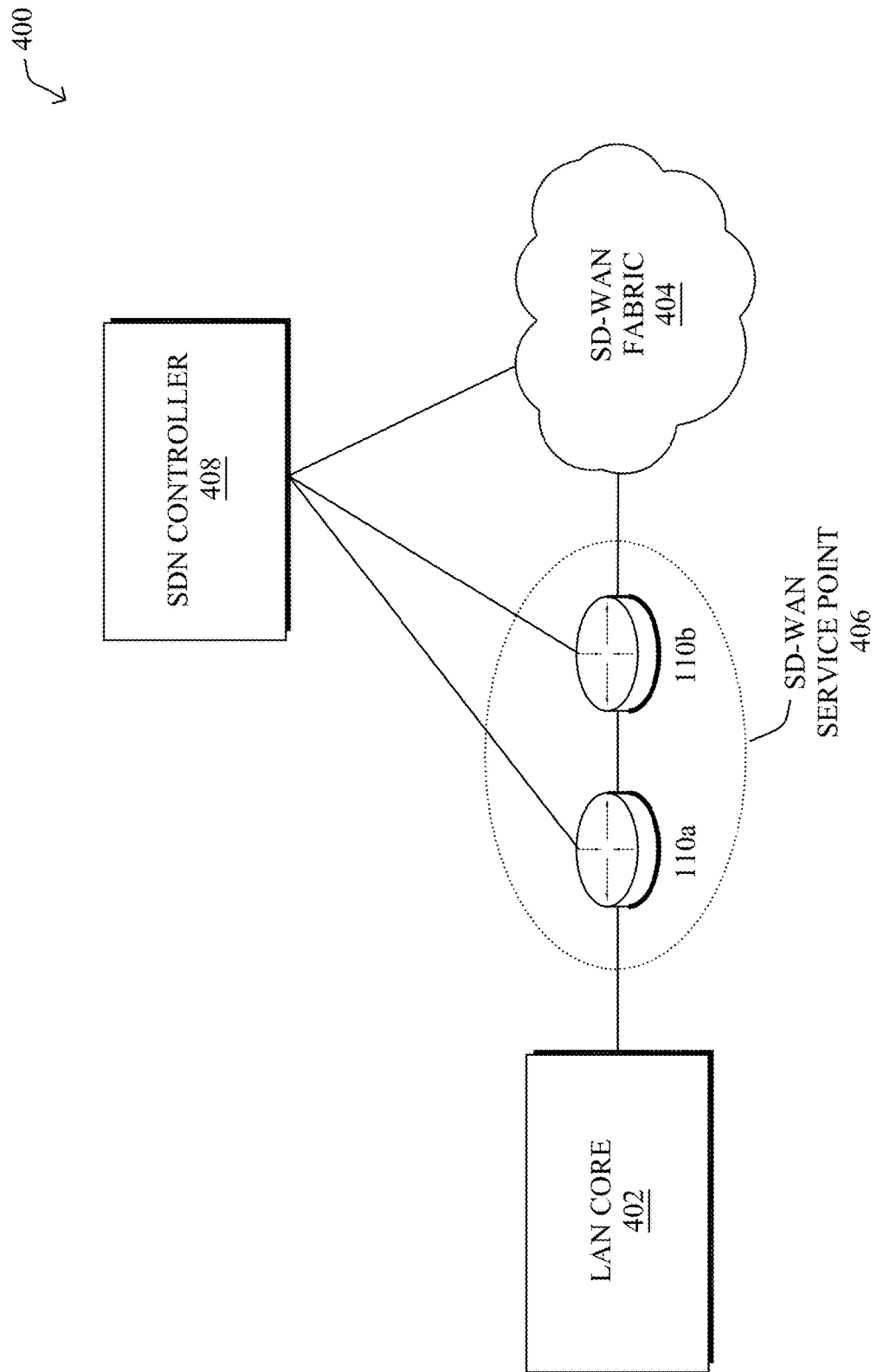
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side. SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet. MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to route traffic so as to satisfy the requirements of the application, as opposed to exclusively relying on the (constrained) shortest path to reach a destination IP address. Various attempts have been made to extend the notion of routing, CSPF, link state routing protocols (ISIS. OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.
Routing is still entirely reactive: decisions are made using probes that reflect the status of a path at a given time, in contrast with the notion of an informed decision.
SLA failures are very common in the Internet and a good proportion of them could be avoided (e.g., using an alternate path), if predicted in advance.

Figure 4B:
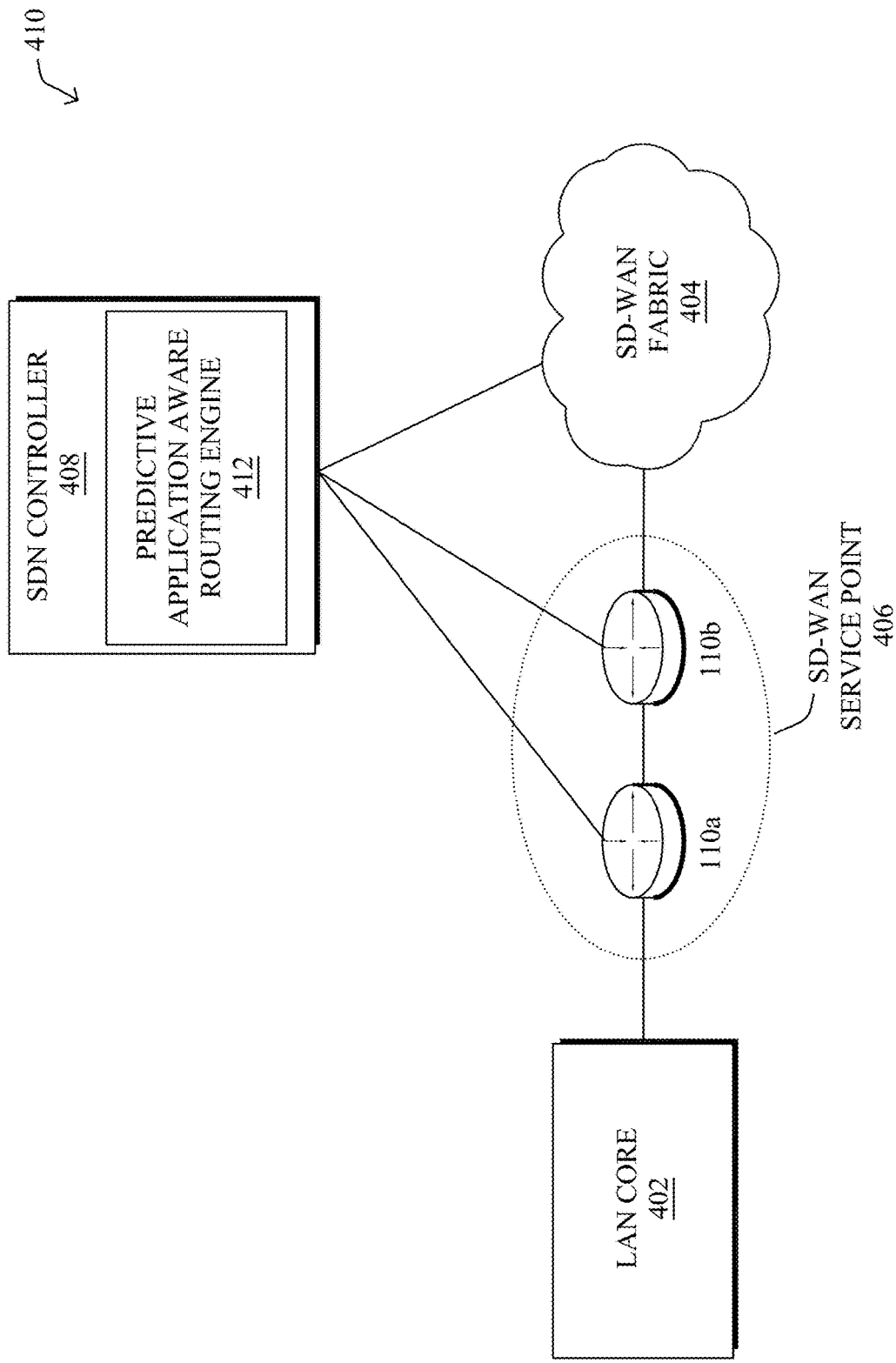

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment.

As would be appreciated, modern SaaS applications are typically delivered globally via public cloud infrastructure using cloud native services. Even though public cloud providers may have a high number of points of presence (PoPs) and use those to deliver the application, globally. Still, testing has shown that user quality of experience (QoE) may vary greatly based on the location of the user. This is because all public cloud providers are delivering services which are region-based and applications are running in specific region(s) and location(s). Indeed, even though it might seem that an online application is global (e.g., because of its use of globally-available CloudFront POPs, etc.), in reality it might run in a single region/location and user experience might vary greatly based on the location.

To determine the QoE for a particular SaaS application, various approaches are possible such as:

Obtaining user feedback directly from the application
Applying traffic analytics, such as by analyzing Netflow records that include extra metrics like Application Response Time (ART)
Sending synthetic path probes to measure networking metrics to each SaaS application from each location. These probes are 'synthetic' in that they seek to mimic the actual characteristics of the traffic of the application under scrutiny.

The first approach above is rarely used today because of its complexity, but can still be used with the techniques herein. Note that relying on direct user feedback to drive routing decisions would also require supporting application programming interfaces (APIs) and the relevant network telemetry, in order to optimize the routing. The second and third approaches above are well-suited for use in Secure Access Service Edge (SASE)/SD-WAN implementations.

In various embodiments, predictive application aware routing engine 412 may make use of any or all of the above approaches. For instance, predictive application aware routing engine 412 may make use of an API for a particular online application, allowing it to obtain application experience/QoE metrics directly from the application. Such metrics may be combined with probing results and/or path telemetry. This is in sharp contrast to network-centric approaches that do not necessarily reflect the true user experience.

As would be appreciated, SASE has emerged in the past few years as an important trend and concept in security and networking. In general, SASE is a network architecture whereby WAN and security are provided jointly as a service, through the use of secure gateways that combine WAN access and cloud-delivered firewalls and security. The overall intent of a SASE is to simplify the network architecture, by connecting all locations to a SASE gateway managed by a provider, such as Cisco Umbrella by Cisco Systems, Inc. The SASE gateway is then responsible for all security policies, as well as for providing WAN connectivity.

SASE providers host their gateways in points of presence (PoPs) around the world, and locations are usually connected to the closest PoP, either in purely geographical terms, or in terms of routing topology using AnyCast. To do so, the location typically establishes a simple, unique, and secure tunnel to the corresponding PoP, and all traffic is sent to the provider.

Figure 5:
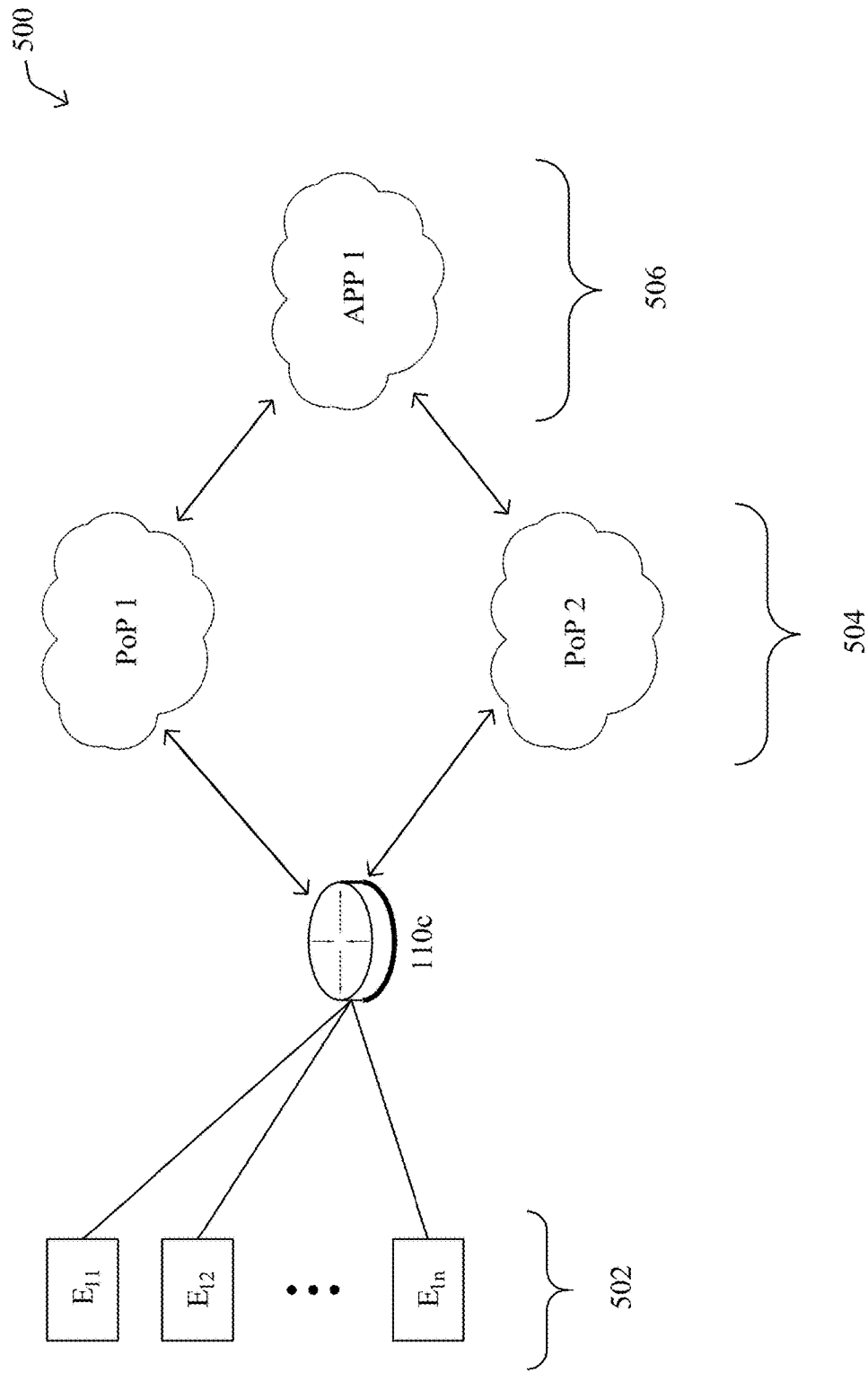
FIG. 5 illustrates an example of an edge router connecting to a cloud-hosted application via multiple points of presence (PoPs)

FIG. 5 illustrates an example 500 of an edge router 110c accessing a cloud-hosted application 506. As shown, assume that there are n-number of endpoints 502 at a particular location for which edge router 110c provides external connectivity. Under a SASE model, a SASE provider may maintain any number of PoPs 504 to which edge router 110c may connect. Accordingly, edge router 110c may access a cloud-hosted application 506, such as an SaaS application, via a first PoP among PoPs 504, a second PoP among PoPs 504, etc.

Although SASE is an attractive model, there are practical challenges. The benefits of SASE usually only focus on security and simplicity of use, while performance is not guaranteed. Indeed, ensuring that traffic SLAs are met may require adjustments that decrease the value of the SASE model:

- To meet SLAs, exceptions might be required for traffic that should not be sent through the gateway but directly sent via Direct Internet Access (DIA) locally, in case the gateway is not able to provide a good enough performance for a specific kind of traffic, which highly depends on Peering between the SASE Gateway PoP and SaaS provider or intermediate Autonomous Systems (AS). For instance, it is sometimes recommended to send out VoIP traffic directly DIA to achieve better performance. However, this defeats the purpose of delivering WAN and security directly in the cloud while relying only on a very simple unique tunnel from all locations.
- Selection of the "closest PoP" is usually based on either geo-location, AnyCast (e.g., for secure web gateways relying on HTTPS proxies), probing results (e.g., selecting the PoP with the lowest latency), or by fixing a static PoP location (e.g., as is usually done when setting up fixed IPsec tunnels). However, SASE providers tend to have rather dense sets of PoPs to which a location can connect. Thus, the closest PoP is not always the best one to use, in terms of providing the best possible application experience. In particular, a PoP might be struggling at certain times of the day to satisfy the SLA of the application traffic, while other nearby PoPs might not.
- The performance of a given PoP can also vary between applications. Indeed, performance can be influenced by any or all of the following factors:
    Edge to PoP.
    PoP load.
    PoP to PoP, if traffic is sent through a backbone.
    PoP to SaaS. Different PoPs might have different types of inter-connect or peering with SaaS services, and might end up going to different SaaS physical endpoints, even if the SaaS exposes a single logical endpoint.

Figure 6A:
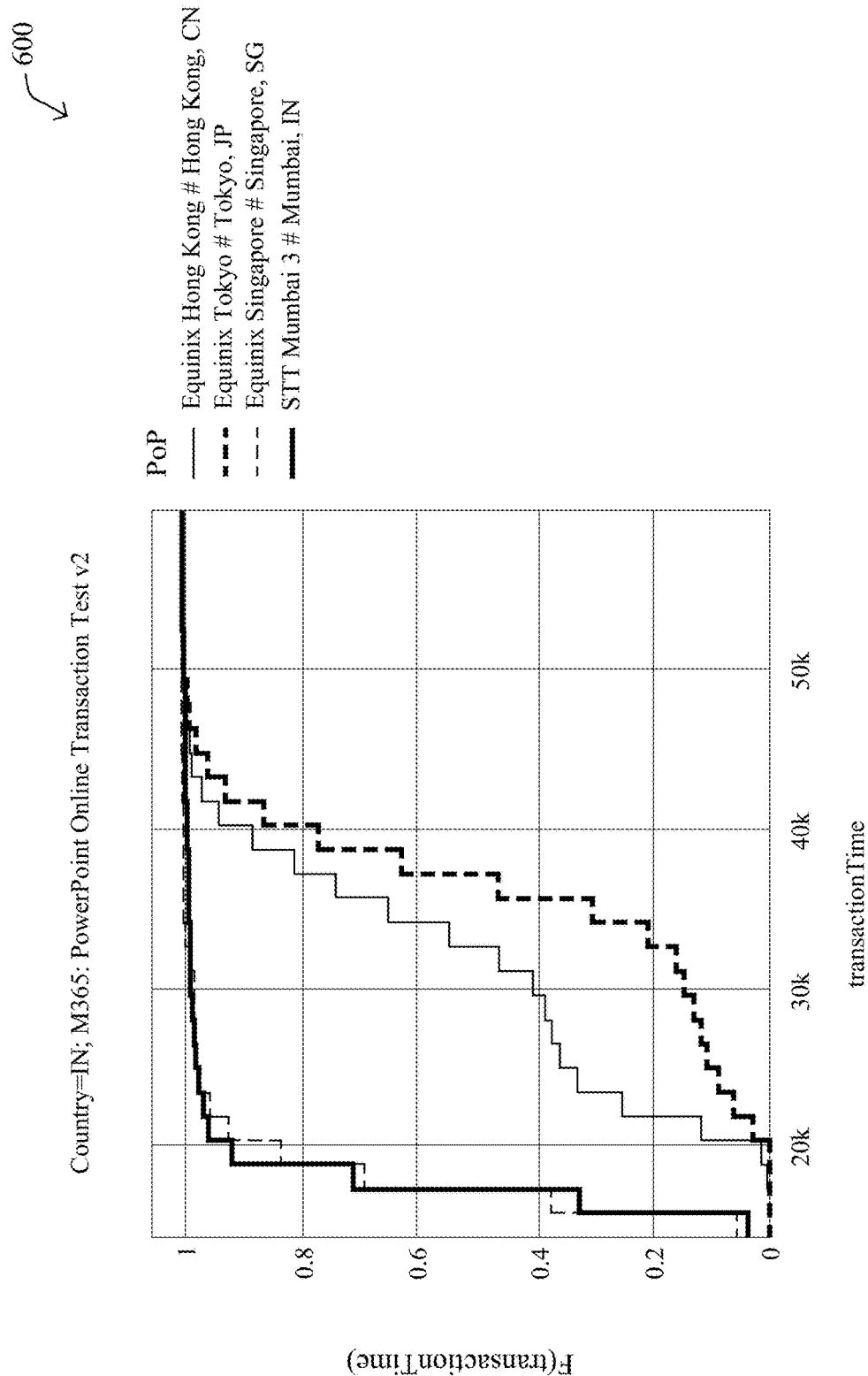
FIGS. 6A-6D illustrate example plots comparing application experience metrics for different PoPs.

By way of example, FIGS. 6A-6D illustrate example plots comparing application experience metrics for different PoPs. For instance, FIG. 6A illustrates a plot 600 showing the transaction time distributions for clients connecting from India (IN) to Office365 PowerPoint via four different PoPs: Equinix Hong Kong, Equinix Tokyo, Equinix Singapore, and STT Mumbai. Here, the transaction time is being used as the application experience metric. As can be seen, the transaction time distribution for PoPs Equinix Singapore and STT Mumbai 3 are much better (median<17 s) than the transaction times for Equinix Hong Kong and Equinix Tokyo (median>32 s). Hence, for clients in India, it is much better to connect to Equinix Singapore or STT Mumbai 3.

Figure 6B:
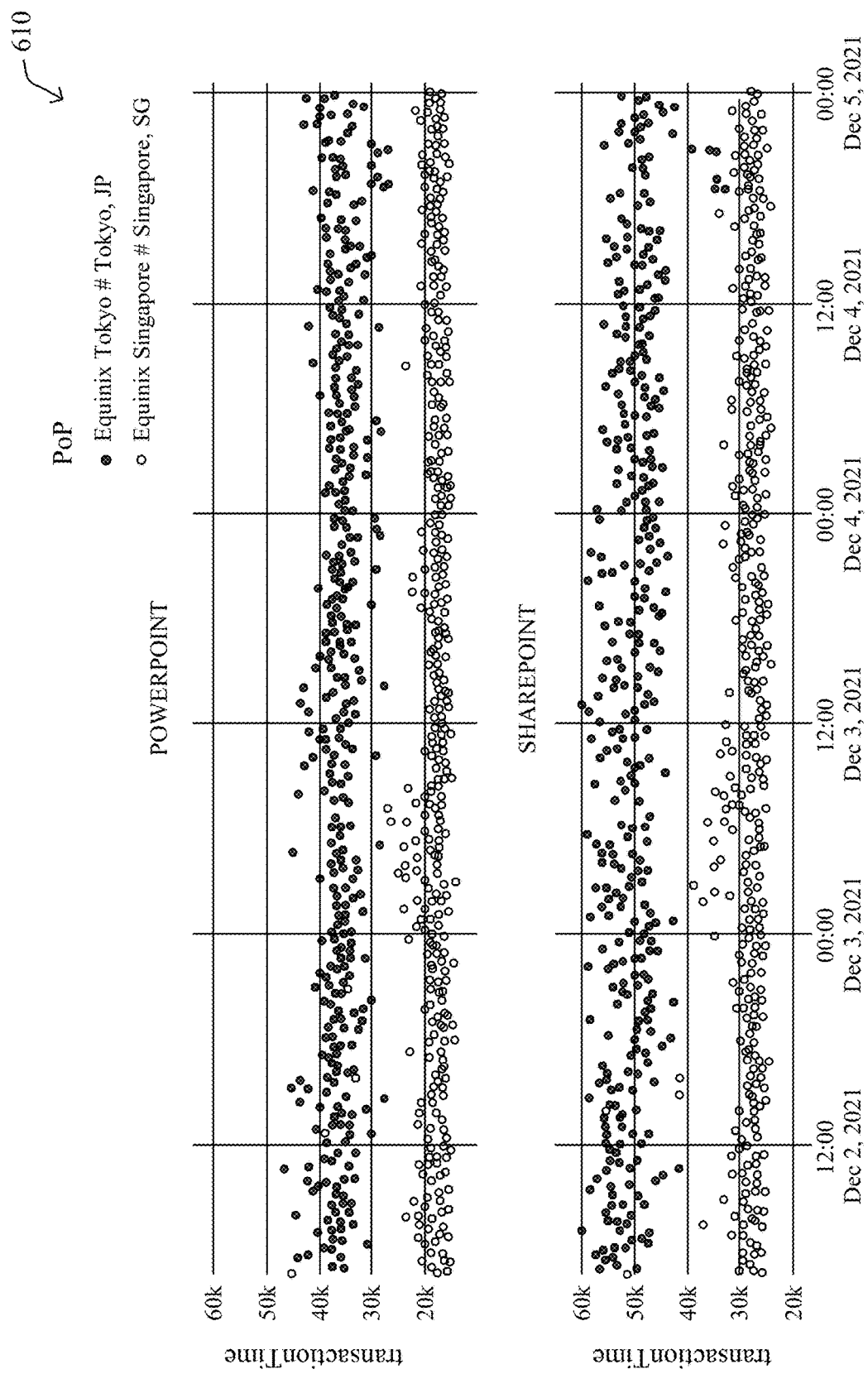

FIG. 6B illustrates a plot 610 of the timeseries of transaction times for two applications, PowerPoint and SharePoint from an agent in India via two PoPs: one located in Tokyo and another in Singapore. In order to compare the two, the agent switched PoPs every fifteen minutes during the test. As can be seen, the PoP located in Singapore has much lower transaction times than that of the PoP in Tokyo, with very little variation in these differences over various days and times of day.

Figure 6C:
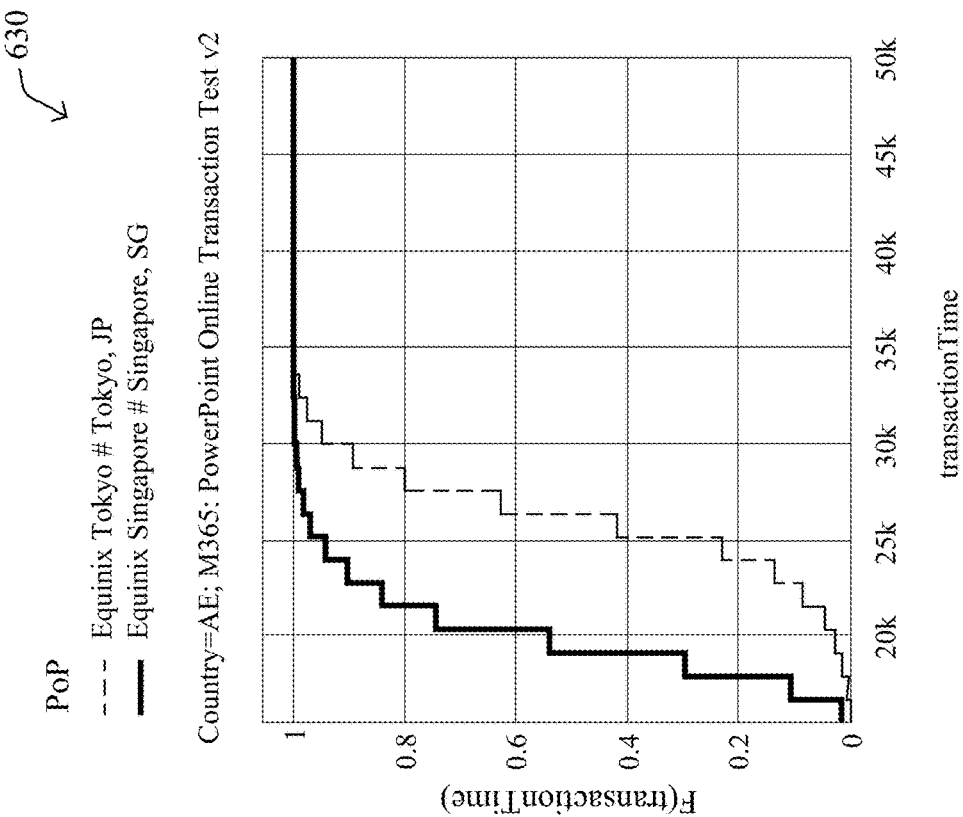
Figure 6D:
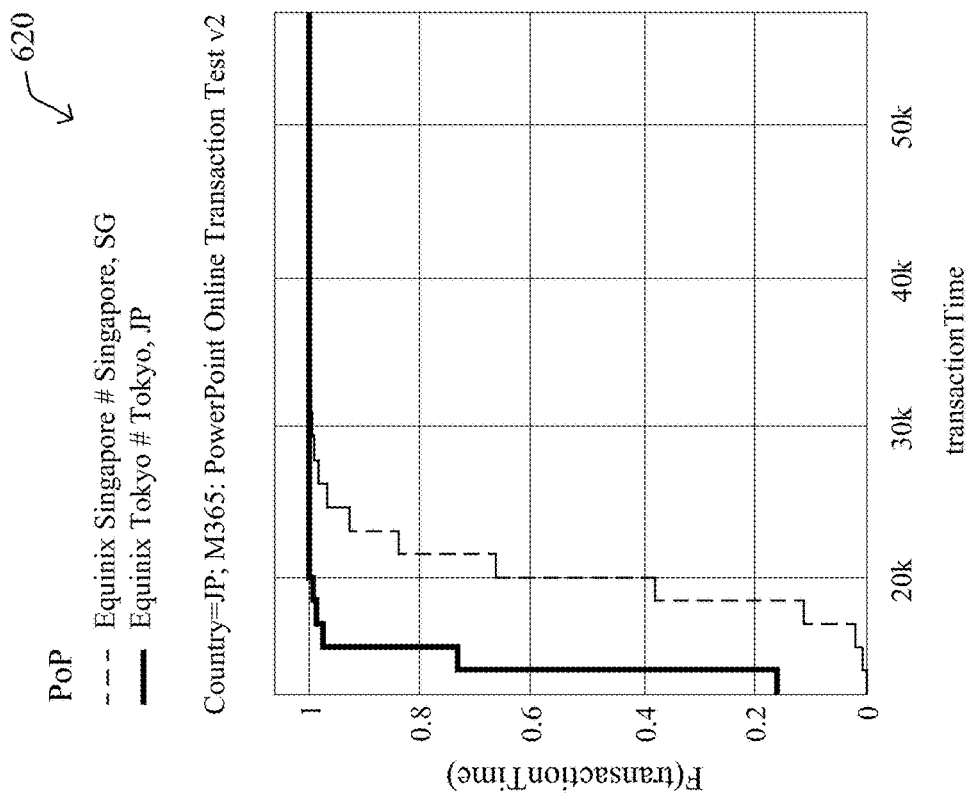

FIG. 6C illustrates a plot 620 of the transaction time distributions for a client located in Japan (JP) connecting to PowerPoint via two different PoPs: one located in Singapore and another located in Tokyo. Similarly, FIG. 6D illustrates a plot 630 of the transaction time distributions for a client located in the United Arab Emirates (UAE) connecting to PowerPoint via those same PoPs. From these, the differences in transaction times clearly suggest that a few PoPs are better than other PoPs.

There can be several reasons for such a discrepancy in application experience across PoPs. First, the nearest PoP may be congested or may induce detrimental network effect such as queuing delays, loss or jitter. Second, even if few probes measure the network metrics, they can still be transient. When the client connects, the application traffic may experience network conditions that was not measured by those few probes. Finally, the nature of the probes (e.g., small 64 byte packets) may not be representative for the application traffic. For example, the probing result may indicate a smaller delay, but a heavier application traffic may face congestion, loss and larger delay. Hence, relying on simple associations of client to PoP often leads to bad application experience. In addition, the application experience afforded by using a certain PoP can also vary over time.

To select the PoP for a client that would maximize the application experience of a certain application, telemetry data needs to be collected across the set of different PoPs available to that client. Thus, probing the possible connections through the different PoPs will need to be performed and at a frequency that is able to capture variations that could occur over time. While exhaustively sampling all viable PoPs would allow for the prediction of the best PoP on a per-application basis, doing so to all PoPs would be impractical at a fine time-based granularity due the corresponding overhead and need to frequently switch traffic between multiple tunnels/paths.

Actively Learning PoPs to Probe and Probing Frequency

The techniques herein allow for the active learning of which PoPs to probe, and at what frequencies, in a manner that maximizes the information gain, so that the best PoP for a client and application can be selected. In some aspects, the techniques herein are predictive in nature (e.g., using machine learning or statistical models), to model the network performance metrics, as well as the application experience metric(s), and their uncertainties. Based on the modeled values, further aspects of the techniques herein relate to selecting which PoP to probe and when. Another aspect of the techniques herein relates to a reactive mechanism that is able to detect sudden changes in the captured metrics and infer the probable root cause (e.g., by evaluating whether the degradation occurs for a single application or across all applications, for a given PoP). Such changes could also trigger additional probing, as needed. In another aspect of the techniques herein, probes may be dynamically enabled and disabled, based on the predicted application traffic, as well.

Illustratively, the techniques described herein may be performed by hardware, software, and/or firmware, such as in accordance with predictive routing process 248 and/or PoP probing process 249, which may include computer executable instructions executed by the processor 220 (or independent processor of interfaces 210) to perform functions relating to the techniques described herein.

Specifically, according to various embodiments, a device computes, for each of a set of points of presence via which traffic for an online application can be sent from a location, application experience metrics predicted for the online application over time. The device assigns, for each of the set of points of presence, weights to different time periods, based on measures of uncertainty associated with the application experience metrics predicted for the online application over time. The device generates, based on the weights assigned to the different time periods for each of the set of points of presence, schedules for probing network paths connecting the location to the online application via those points of presence. The device causes the network paths to be probed in accordance with their schedules. Results of this probing are used to select a particular point of presence from among the set of points of presence via which traffic for the online application should be sent from the location during a certain time period.

Figure 7:
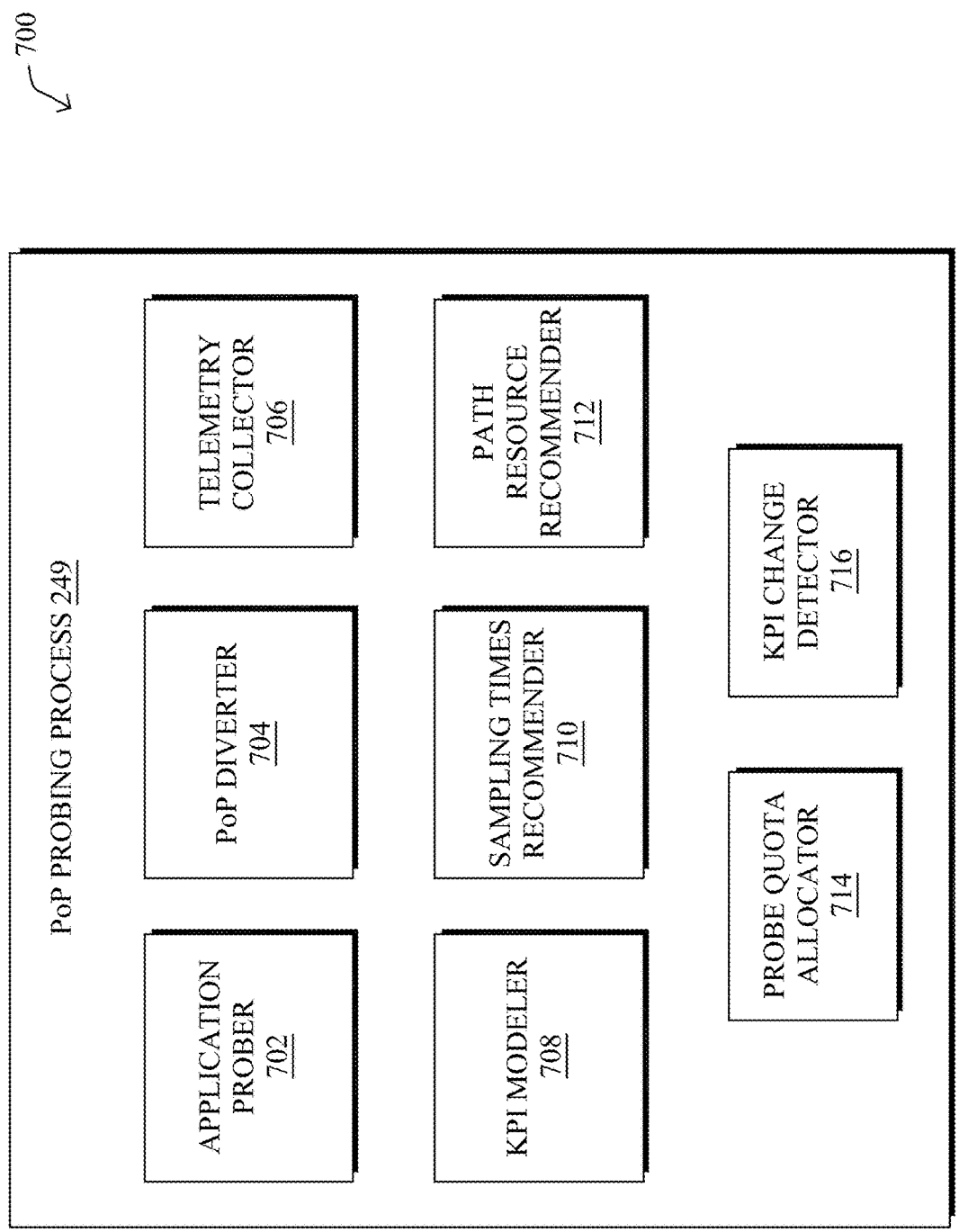
FIG. 7 illustrates an example architecture for actively learning which PoPs to probe and at which times.

Operationally, FIG. 7 illustrates an example architecture 700 for actively learning which PoPs to probe and at which times, according to various embodiments. At the core of architecture 700 is PoP probing process 249, which may be executed by a controller for a network or another device in communication therewith. For instance, PoP probing process 249 may be executed by a controller for a network (e.g., SDN controller 408 in FIGS. 4A-4B), a particular networking device in the network (e.g., a router, etc.), a client in a network, another device or service in communication therewith, or the like. In further embodiments, architecture 700 may be implemented as part of a SASE deployment.

As shown, architecture 700 may include any or all of the following components: an application prober 702, a PoP diverter 704, a telemetry collector 706, a key performance indicator (KPI) modeler 708, a sampling times recommender 710, a path resource recommender 712, a probe quota allocator 714, and/or a KPI change detector 716. As would be appreciated, the functionalities of these components may be combined or omitted, as desired. In addition, these components may be implemented on a singular device or in a distributed manner, in which case the combination of executing devices can be viewed as their own singular device for purposes of executing PoP probing process 249.

In general, application prober 702 may be responsible for pinging a particular application server from a client, in various embodiments. To this end, application prober 702 may take as input any or all of the following parameters:

The set of online application servers to probe (e.g., Webex, Office365, etc.)

The set of KPIs to measure (e.g., application experience metrics such as mean opinion score for a voice application, transaction time for a productivity application such as Office365 PowerPoint, etc.).

The probing frequency and/or schedule to use (e.g., measure once every 5 minutes for the next 1 day or until stopped).

In some embodiments, application prober 702 may also purposefully exclude probing the current PoP being used by the client to access the online application. This is to avoid application prober 702 disrupting other application traffic by changing the routing.

PoP probing process 249 may also include PoP diverter 704, which is responsible for diverting all traffic for a given set of one or more applications to a given PoP. This can be cloud-based or executed locally on an edge router, for instance. In one embodiment, each edge router may execute its own PoP diverter 704 and sent instructions from a central control mechanism to change the PoP for certain application traffic. In such cases, PoP diverter 704 may then create or reuse a tunnel for that PoP and switch all of the application traffic specified to that PoP.

In another embodiment, PoP diverter 704 may be implemented in a hybrid cloud and edge-based manner. In this case, the centralized version of PoP diverter 704 (e.g., in the cloud) may take as input the PoP, application, and set of router(s) to which the policy should apply. This can be input using, say, an application programming interface (API) call. In turn, the central PoP diverter 704 may send a custom message to the edge router(s) to apply such a policy.

In yet another embodiment, PoP diverter 704 may be configured to switch between a given set of PoPs at a given time schedule (e.g., a periodic schedule that switches between PoPs in every 5 minutes in a round robin fashion for all configured PoPs or changes PoPs according to a given schedule). In some instances, PoP diverter 704 may provide data to a user interface that allows an administrator to configure or approve a given PoP diverting schedule. PoP diverter 704 could also use other techniques to enforce traffic redirection to certain PoP, such as DNS interception, in further cases.

Telemetry collector 706 may be responsible for collecting KPIs for a set of one or more applications of interest and tagging the corresponding routers, PoPs, and application servers used for all of the probes, in various embodiments. In some embodiments, telemetry collector 706 may obtain any or all of the following:

1. Telemetry collected by application prober 702: for instance, such telemetry may include timing information (e.g., a timestamp of when a probe was sent), router or client information (e.g., agent name, router public IP address, etc.), application information (e.g., the name or ID of the application), network metrics (e.g., ping latency, loss, jitter, etc. between a router, PoP, and/or application server), application experience metrics (e.g., transaction times, mean opinion scores, concealment times, user satisfaction ratings, etc.), or the like.

2. Device metadata: for instance, metadata such as the geolocation, device type, etc. of the router, client, or the like.
3. Tunnel association information: each router may monitor the sessions that are sent over different tunnels and the tunnel association information collected for use by PoP probing process 249.
4. PoP association information: this information may indicate the PoP associated with each tunnel/path.

Note that the data from application prober 702 can be combined with tunnel association and PoP association information, which can also be associated with the path metrics, timing information, PoP information, application information, etc. In some instances, all of this telemetry can be stored in a common telemetry datalake.

In general, KPI modeler 708 may be responsible for determining the variations in the KPIs across time between any or all combinations of router, PoP, and application. In one embodiment, a path is defined as a combination of <router, PoP, application>. Let K(PR, S, A, t) be the KPI K at time t for a path PR, S, A=<router R, PoP S, application A> (e.g., K=transactionTime for some router R, via the PoP="Equinix Singapore" for application A=Office365 Sharepoint). Note that K(PR, S, A, *) is a timeseries. The objective of KPI modeler 708 is to model and predict the KPI values and their associated uncertainty.

In a very simple embodiment, KPI modeler 708 may predict KPI values at time t by using descriptive statistics based on the data over a prior timespan (e.g., in the last, say, 6 hours). For example, KPI modeler 708 may compute and store the mean and the standard deviation of K(PR, S, A, *) for every KPI K and Path PR, S, A.

In another embodiment, KPI modeler 708 may measure and bucketize the measured KPIs for times, days, etc. For instance, one such bucket may be <Monday, 10:00-11:00 UTC>). In such cases, KPI modeler 708 may compute the mean and standard deviation for each bucket.

In yet another embodiment, KPI modeler 708 may leverage a machine learning model that has been trained to predict the mean and uncertainty of the KPIs. For example, a Gaussian Process model can be trained on every timeseries K(PR, S, A, *) and output the mean and standard deviation at every point in time.

Figure 8A:
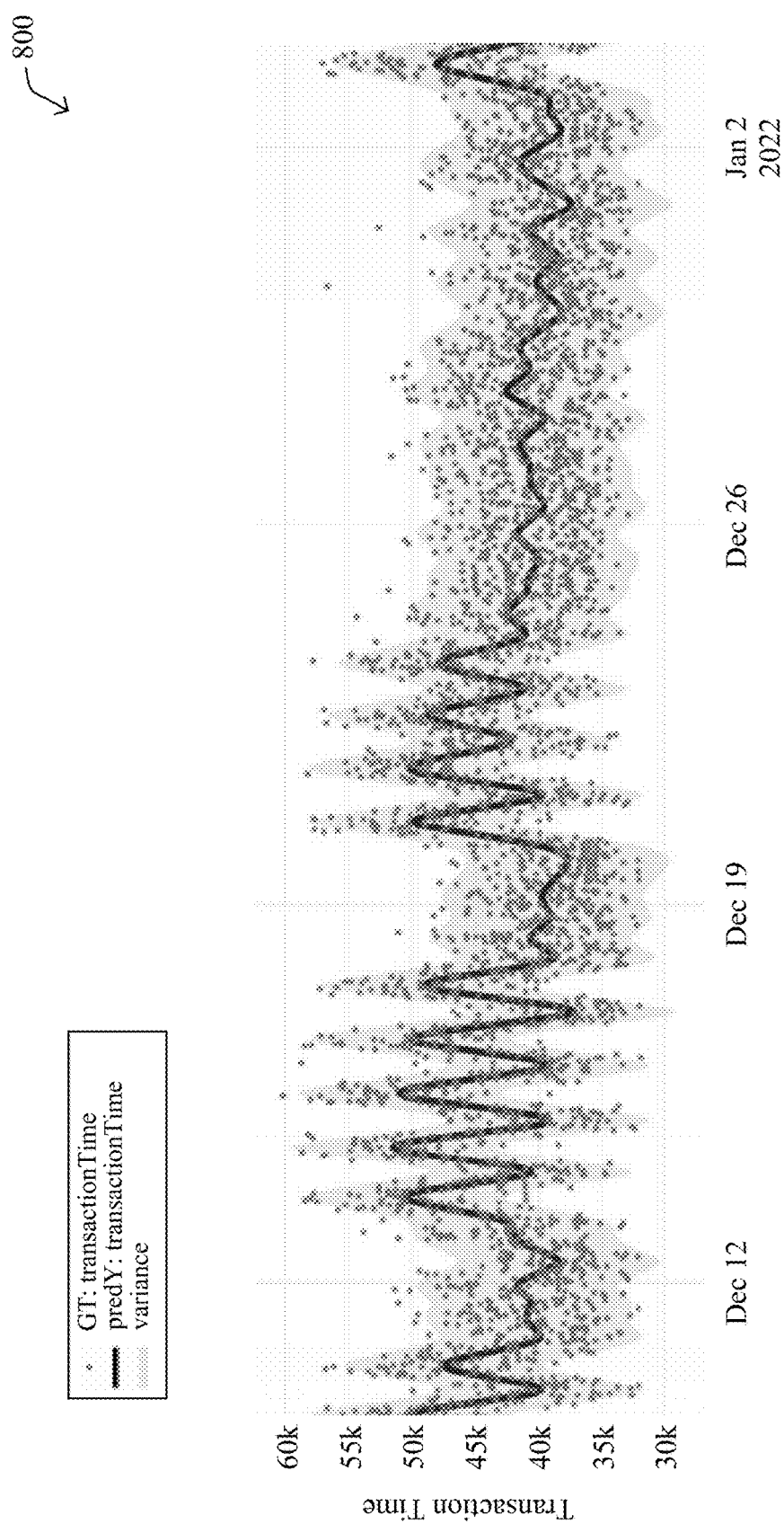
FIGS. 8A-8B illustrate example plots of application experience metric predictions over time.
Figure 8B:
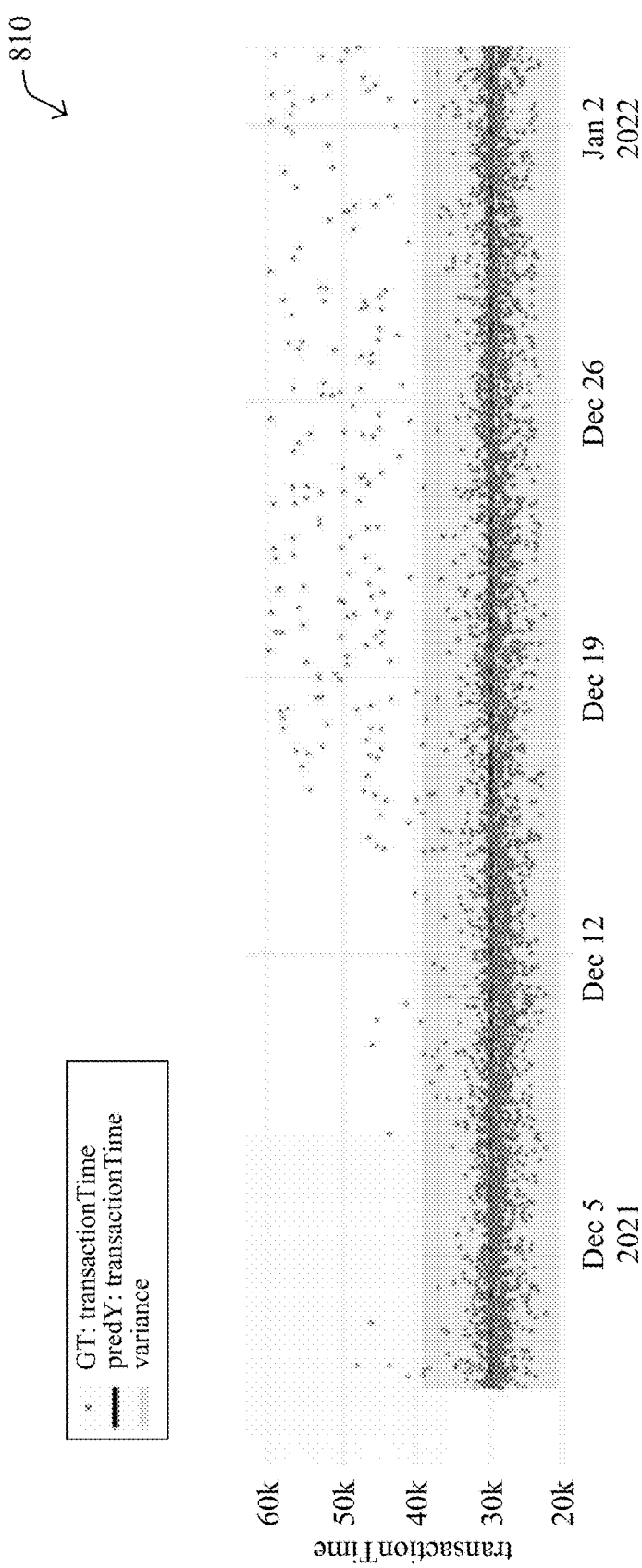

FIGS. 8A-8B illustrate example plots of application experience metric predictions over time, in various embodiments. More specifically, FIG. 8A illustrates an example plot 800 of the transaction time (in ms) for a periodic path. As shown, the dots labeled 'GT' represent the actual transaction times measured from a router in Johannesburg, South Africa, pinging Office365 SharePoint via a SASE PoP (Umbrella SIG) in Paris, France. The predicted transaction times, labeled 'predY' from a prototype prediction model are also shown in plot 800. In addition, the confidence band for the predictions, referred to as the 'variance' is shown in plot 800, as well. Here, the confidence band is the mean 2*standard-deviation at any given point in time. A few things can be noted: 1.) the telemetry is noisy, and 2.) there is some periodic structure to the timeseries whereby the peak transaction time is around 50 seconds (50 k ms) during weekdays peak hours and around 40 seconds during off-peak hours. Such periodic structures are well suited to be modeled by a Gaussian Process by mixing a variety of kernels such as a Periodic Kernel with a Radial Basis Function (RBF) kernel.

FIG. 8B illustrates another example plot 810 of the transaction times over time for another router-PoP-application combination/path. Similar to plot 800, the dots labeled 'GT' represent the actual transaction times measured for this combination, 'predY' represents the predicted transaction times, and the 'variance' shown represents the uncertainty of the model for its predictions. Here, the transaction time is almost constant (e.g., 30 seconds), with some variation. Note that if the router-PoP-application combination does not exhibit any periodic behavior, the model will automatically not include such behaviors (e.g., the measured transaction times outside of the uncertainty band in FIG. 8B)

Referring again to FIG. 7, sampling times recommender 710 may be responsible for assigning a probing weight for every time period (e.g., every hour) and for each path, in various embodiments. In one embodiment, sampling times recommender 710 may analyze the output of KPI modeler 708, to choose the best weights to sample. For example, the uncertainty across days at every time period 't' can be monitored for every path K(PR, S, A, *). If the standard deviation of K(PR, S, A, t) is high, then sampling times recommender 710 may assign a higher weight for that time period to sample, so that more samples can be taken during periods of high uncertainty. The time periods can then be prioritized based on the weights, with periods of higher uncertainty receiving higher scores. In further embodiments, sampling times recommender 710 may also differentiate between different types of time periods, such as those that fall on weekdays vs. weekends, working hours vs. non-working hours, etc.

In yet another embodiment, the traffic to different applications may be measured across time periods 't' for every path K(PR, S, A, t), and sampling times recommender 710 may only assign weights to those time periods having application traffic greater than a threshold amount (e.g., n-number of sessions, etc.). Other time periods having application traffic below the threshold may be assigned a default, very low weight, so as to only explore them, occasionally.

In some embodiments, sampling times recommender 710 may receive data from a user interface indicative of a quota for probing. For instance, an administrator may specify that the probing for every path should not exceed 1,000 times per day. In turn, sampling times recommender 710 may take this into account when assigning priorities to the probing times for the router-PoP-application combinations/paths.

Note that as new data points emerge (e.g., as a result of the probing), the uncertainty may also vary across times. Accordingly, sampling times recommender 710 may generate its weights periodically or continuously. In another embodiment, both the mean and standard deviation at different time-periods (e.g., hours of the day) can be used so that sampling is done aggressively during, or right before, peak periods. Thus, the output of sampling times recommender 710 may be a probing schedule for each path K(PR, S, A, t).

In various embodiments, path resource recommender 712 may be responsible for assigning weights to each path indicative of the amount of resources should be allocated for that path. While sampling times recommender 710 may be leveraged to answer the question "when should a path be probed?" path resource recommender 712 may be used to answer the question "by how much?" To do so, path resource recommender 712 may examine the output of KPI modeler 708, to determine whether additional sampling is necessary and useful and, if so, what weighting should be applied to that path.

In one embodiment, path resource recommender 712 may assign its weights, based on whether the network KPIs (e.g., loss, latency, jitter, etc.) are useful to predict the application experience metrics/KPIs (e.g., MOS scores, etc.). If there is a high-predictive power, then path resource recommender 712 may assign weights that cause those KPIs for the path to be sampled more often. Path resource recommender 712 may quantify the predictive power of the network KPIs in a number of ways. In some cases, it could rely on a simple correlation metric such as Pearson's correlation coefficient or Kendall's rank correlation coefficient. These metrics range from [−1, 1] with −1 being negatively correlated, 0 being uncorrelated, and +1 being positively correlated. If there is either a high positive or negative correlation (abs (correlation) is close to 1), then path resource recommender 712 may use this for the weighting or base the weighting on it. In other approaches, path resource recommender 712 may use a regression model constructed with network KPIs at time-periods (t−n) to (t−1) as features and application KPI/experience metric at time t as the target. The most important features (which can be measured by feature-importance scores) can be weighted highly by path resource recommender 712 as they are helpful in forecasting the application experience.

In other embodiment, a path that has constant variance and mean, such as in the case in FIG. 8B, need not be sampled more often than a path with non-constant means, as in the case in FIG. 8A. Accordingly, path resource recommender 712 may employ an algorithm that considers the variation of mean and standard deviation of K(PR, S, A, t). For example, path resource recommender 712 may compute the coefficient of variation (CoV) of the predicted mean and standard deviation of K(PR, S, A, t). If they are less than a threshold (e.g., CoV(mean)<0.2 and CoV(std)<0.2), path resource recommender 712 may put the paths can be put into an 'explore occasionally' category, and assign weights to them, accordingly, so as to only probe them, occasionally. The other paths may be weighted by path resource recommender 712 based on the CoV scores of mean and standard deviations. For example, path resource recommender 712 may assign greater weights to paths with high variation in mean and/or standard deviation.

In yet another embodiment, the traffic to different applications may be measured, and only the paths with application traffic greater than, say, x sessions assigned weights by path resource recommender 712. Other paths may be added to the "explore occasionally" category. As a result, path resource recommender 712 may effectively suggest an increase or decrease to the sampling/probing frequency for a specific path and application.

Probe quota allocator 714 may be responsible for allocating an amount of probing resources to the various paths at various times, in various embodiments. In one embodiment, an administrator may specify a per-path or overall quota. For instance, the administrator may specify that paths P1, P2, and P3 to SharePoint should be probed using 1,000 probing requests per day. In another example quota, the administrator may limit the number of probes to a mean of ten probes per hour per path. Such quotas may be specified via a user interface, configuration file, or the like.

In some embodiments, probe quota allocator 714 may determine the amount of probing for a given time period, based on the weights computed by sampling times recommender 710 and/or path resource recommender 712, while also taking into consideration any specified quotas. In one approach, probe quota allocator 714 may first compute a per-path quota, if not already specified. In turn, probe quota allocator 714 may then allocate probing to any other path, based on an overall quota. For example, given a set of remaining paths $P_i$ with weight $w_i\{(P_1, w_1), (P_2, w_2), \ldots, (P_n, w_n)\}$, the quota can be split between the paths proportional to their weights. Once the per-path quota has been determined, probe quota allocator 714 may select the time(s) to probe each path. Similar to above, the quota of probes may be split between different periods, as dictated by the weights for different times by sampling times recommender 710.

In other embodiments, probe quota allocator 714 may jointly optimize the path and time quotas. For example, for every path and every period, a weight can be assigned to every hour for every path that is equal to the product of per-path and per-hour weights (w=wp*wt). Probe quota allocator 714 can use these weights to split the probe quota.

In yet another embodiment, probe quota allocator 714 may reserve a portion of the quota to randomly probe each path at a random time with a certain probability. This is to ensure that exploratory probes are sent during times that are not dictated by the past data and model predictions alone.

In further embodiments, probe quota allocator 714 may assign probing quotas to various paths and time periods taking into account any or all of the following limits:
 SaaS application limitations (e.g., SharePoint limiting the number of application probes per IP/organization/user). Often, these limits are configurable by the administrator of the application.
 Infrastructure limitations (e.g., the SDWAN fabric already has specific limits, such as a maximum number of BFD/CXP probes, and it is riskier to increase probing there than within a datacenter.
 Interface limitations (e.g., it may be safer to send 1,000 probes per second over 10 Gbit/s interface than it is over LTE/5G link).

All of the above limits and risks can be configured manually by the administrator or a default set of weights can be used (e.g., the default weight for an LTE interface may be orders of magnitude smaller than for the 10 Gbit/s interface). Thus, probe quota allocator 714 may cause the LTE interface to be probed by a proportionately smaller factor in comparison to the 10 Gbit/s interface.

Finally, PoP probing process 249 may also include KPI change detector 716, which is responsible for detecting sudden changes in the path or path KPIs, and to request probe changes. In one embodiment, KPI change detector 716 may constantly monitor the raw probe results, to detect sudden changes in the moving averages. This can be done by first computing a moving average of the KPI, and then using a statistical or machine learning-based approach, such as Change Point Detection, to detect sudden changes.

If KPI change detector 716 detects a sudden change in the monitored KPIs (e.g., a sudden increase in transaction time, latency, or loss, decrease in MOS scores, etc.), KPI change detector 716 may flag those paths. In turn, KPI change detector 716 may a.) send a message to application prober 702 to probe that path more aggressively, and b.) inform sampling times recommender 710 and path resource recommender 712 to disable the model usage rerun their modeling based on the changed data.

Figure 9:
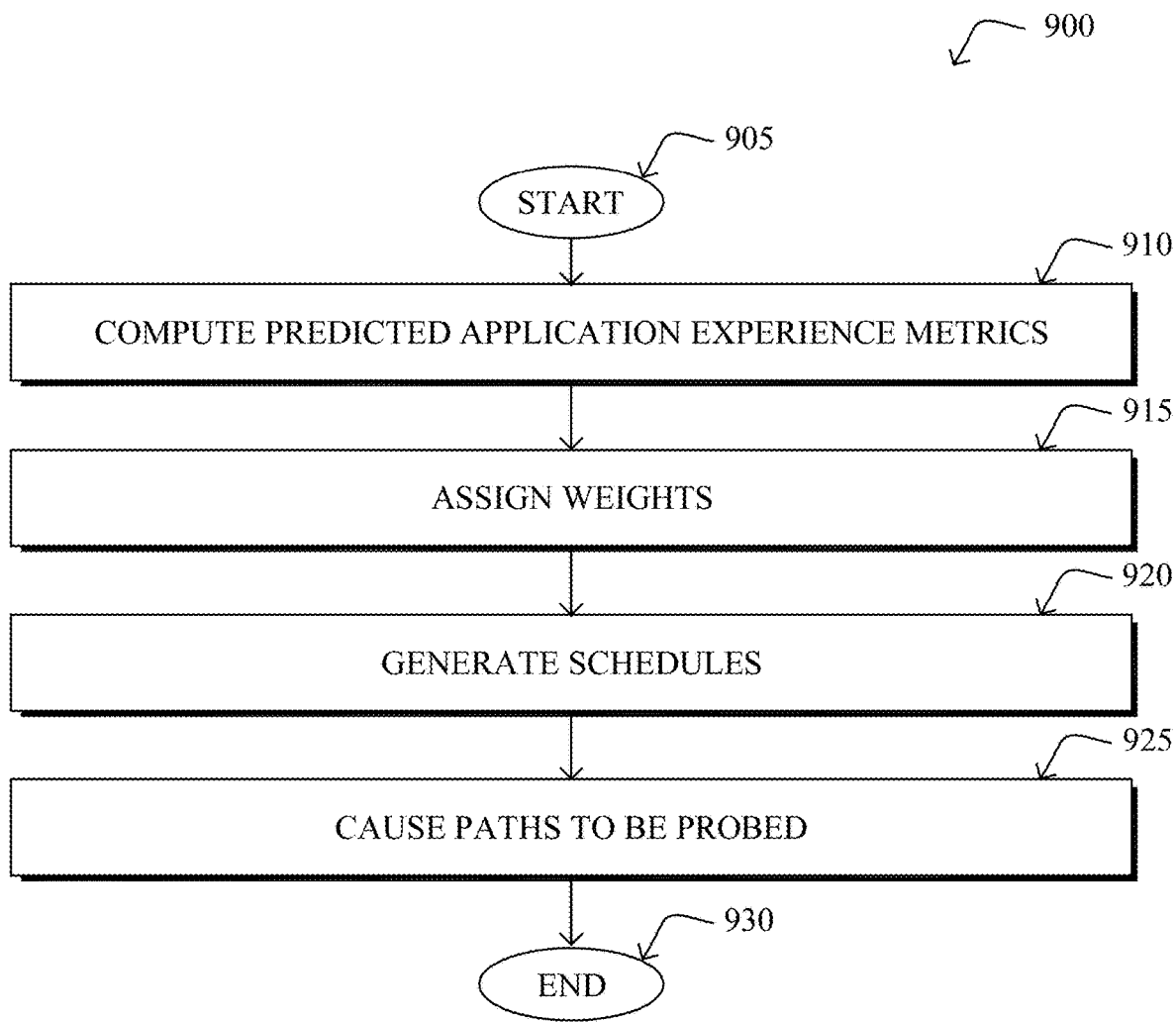
FIG. 9 illustrates an example simplified procedure for probing PoPs in a network.

FIG. 9 illustrates an example simplified procedure 900 (i.e., a method) for probing PoPs in a network, in accordance with one or more embodiments described herein. For example, a non-generic, specifically configured device (e.g., device 200), such as controller for a network (e.g., an SDN controller or other device in communication therewith), a networking device, etc., may perform procedure 900 by executing stored instructions (e.g., PoP probing process 249). The procedure 900 may start at step 905, and continues to step 910, where, as described in greater detail above, the device may compute, for each of a set of points of presence (PoPs) via which traffic for an online application can be sent from a location, application experience metrics predicted for the online application over time. In various embodiments, the application experience metrics comprise at least one of: a transaction time for the online application, a mean opinion score (MOS) for the online application, or satisfaction ratings provided by users of the online application. In some embodiments, the application experience metrics are predicted based on path metrics obtained from the network paths.

At step 915, as detailed above, the device may assign, for each of the PoPs, weights to different time periods, based on measures of uncertainty associated with the application experience metrics predicted for the online application over time. In some embodiments, the device may do so based in part on a number of sessions or traffic volume for the online application (e.g., the device may not weight a particular path during a certain time, or give it a low default weight, if the number of sessions along that path are below a threshold).

At step 920, the device may generate, based on the weights assigned to the different time periods for each of the set of points of presence, schedules for probing network paths connecting the location to the online application via those points of presence, as described in greater detail above. In some embodiments, the schedules exclude probing of at least one of the network paths whose path metrics have low predictive power scores for the application experience metrics. In various embodiments, the device may generate the schedules by allocating probing across the different time periods and network paths, to maximize their corresponding weights, given one or more probe quotas. In one embodiment, the one or more probe quotas specify a number of probes that can be sent during a specified timespan. In another embodiment, the one or more probe quotas are specified via a user interface. In a further embodiment, the one or more probe quotas include per-path quotas for the network paths. In another embodiment, the schedules for probing the network paths include at least some randomly-scheduled probes.

At step 925, as detailed above, the device may compute the network paths to be probed in accordance with their schedules. In various embodiments, results of this probing are used to select a particular point of presence from among the set of points of presence via which traffic for the online application should be sent from the location during a certain time period. In some embodiments, the device may also adjust one of the schedules for probing a particular one of the network paths, in response to detecting a change in the application experience metrics for that path. Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for actively learning which PoPs to probe and at what frequency, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   computing, by a device and for each of a set of points of presence via which traffic for an online application can be sent from a location, application experience metrics predicted for the online application over time;
   assigning, by the device and for each of the set of points of presence, weights to different time periods, based on measures of uncertainty associated with the application experience metrics predicted for the online application over time;
   generating, by the device and based on the weights assigned to the different time periods for each of the set of points of presence, schedules for probing network paths connecting the location to the online application via the set of points of presence, wherein the schedules allocate probing across the different time periods and network paths, to maximize their corresponding weights, given one or more probe quotas specified via a user interface; and
   causing, by the device, the network paths to be probed in accordance with their schedules, wherein results of this probing are used to select a particular point of presence from among the set of points of presence via which traffic for the online application should be sent from the location during a certain time period.

2. The method as in claim 1, wherein the application experience metrics comprise at least one of: a transaction time for the online application, a mean opinion score (MOS) for the online application, or satisfaction ratings provided by users of the online application.

3. The method as in claim 1, wherein the application experience metrics are predicted based on path metrics obtained from the network paths, and wherein the schedules exclude probing of at least one of the network paths whose path metrics have low predictive power scores for the application experience metrics.

4. The method as in claim 1, wherein the device assigns the weights based in part on a number of sessions or traffic volume for the online application.

5. The method as in claim 1, wherein the one or more probe quotas specify a number of probes that can be sent during a specified timespan.

6. The method as in claim 1, wherein the one or more probe quotas include per-path quotas for the network paths.

7. The method as in claim 1, further comprising:
adjusting, by the device, one of the schedules for probing a particular one of the network paths, in response to detecting a change in the application experience metrics for that path.

8. The method as in claim 1, wherein the schedules for probing the network paths include at least some randomly-scheduled probes.

9. An apparatus, comprising:
one or more network interfaces;
a processor coupled to the one or more network interfaces and configured to execute one or more processes; and
a memory configured to store a process that is executable by the processor, the process when executed configured to:
compute, and for each of a set of points of presence via which traffic for an online application can be sent from a location, application experience metrics predicted for the online application over time;
assign, for each of the set of points of presence, weights to different time periods, based on measures of uncertainty associated with the application experience metrics predicted for the online application over time;
generate, based on the weights assigned to the different time periods for each of the set of points of presence, schedules for probing network paths connecting the location to the online application via the set of points of presence, wherein the schedules allocate probing across the different time periods and network paths, to maximize their corresponding weights, given one or more probe quotas specified via a user interface; and
cause the network paths to be probed in accordance with their schedules, wherein results of this probing are used to select a particular point of presence from among the set of points of presence via which traffic for the online application should be sent from the location during a certain time period.

10. The apparatus as in claim 9, wherein the particular point of presence is selected from among the set of points of presence to maximize an application experience of the online application.

11. The apparatus as in claim 9, wherein the application experience metrics are predicted using a machine learning or statistical model.

12. The apparatus as in claim 9, wherein the apparatus assigns the weights based in part on a number of sessions or traffic volume for the online application.

13. The apparatus as in claim 11, wherein the one or more probe quotas specify a number of probes that can be sent during a specified timespan.

14. The apparatus as in claim 9, wherein the one or more probe quotas include per-path quotas for the network paths.

15. The apparatus as in claim 9, wherein the process when executed is further configured to:
adjust one of the schedules for probing a particular one of the network paths, in response to detecting a change in the application experience metrics for that path.

16. A tangible, non-transitory, computer-readable medium storing program instructions that cause a device to execute a process comprising:
computing, by the device and for each of a set of points of presence via which traffic for an online application can be sent from a location, application experience metrics predicted for the online application over time;
assigning, by the device and for each of the set of points of presence, weights to different time periods, based on measures of uncertainty associated with the application experience metrics predicted for the online application over time;
generating, by the device and based on the weights assigned to the different time periods for each of the set of points of presence, schedules for probing network paths connecting the location to the online application via the set of points of presence, wherein the schedules allocate probing across the different time periods and network paths, to maximize their corresponding weights, given one or more probe quotas specified via a user interface; and
causing, by the device, the network paths to be probed in accordance with their schedules, wherein results of this probing are used to select a particular point of presence from among the set of points of presence via which traffic for the online application should be sent from the location during a certain time period.

* * * * *